(12) United States Patent
Petschnigg et al.

(10) Patent No.: US 8,464,170 B2
(45) Date of Patent: Jun. 11, 2013

(54) 2D EDITING METAPHOR FOR 3D GRAPHICS

(75) Inventors: Georg F. Petschnigg, Redmond, WA (US); Matthew W. Kernek, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1279 days.

(21) Appl. No.: 11/302,006

(22) Filed: Dec. 12, 2005

(65) Prior Publication Data

US 2007/0057940 A1 Mar. 15, 2007

Related U.S. Application Data

(60) Provisional application No. 60/715,659, filed on Sep. 9, 2005.

(51) Int. Cl.
G06F 3/048 (2006.01)
G06T 15/00 (2011.01)
G06T 17/00 (2006.01)

(52) U.S. Cl.
USPC ............ 715/764; 715/810; 345/419; 345/420

(58) Field of Classification Search
USPC .............. 715/764, 765, 766, 810, 848, 849, 715/852; 345/419, 420, 421, 422, 589, 593, 345/594
See application file for complete search history.

(56) References Cited

U.S. PATENT DOCUMENTS

| | | | |
|---|---|---|---|
| 5,280,576 A | 1/1994 | Cao | |
| 5,561,745 A * | 10/1996 | Jackson et al. | 345/419 |
| 5,883,639 A | 3/1999 | Walton et al. | 345/473 |
| 5,986,675 A | 11/1999 | Anderson et al. | 345/473 |
| 5,990,900 A * | 11/1999 | Seago | 345/427 |
| 6,057,858 A * | 5/2000 | Desrosiers | 345/467 |
| 6,091,422 A | 7/2000 | Ouaknine et al. | 345/419 |
| 6,208,347 B1 * | 3/2001 | Migdal et al. | 345/419 |
| 6,281,903 B1 * | 8/2001 | Martin et al. | 345/421 |
| 6,392,701 B1 | 5/2002 | Akeyama | |
| 6,512,522 B1 | 1/2003 | Miller et al. | 345/474 |
| 6,633,300 B1 | 10/2003 | Tomack et al. | 345/581 |
| 6,677,944 B1 * | 1/2004 | Yamamoto | 345/422 |

(Continued)

FOREIGN PATENT DOCUMENTS

| | | |
|---|---|---|
| GB | 2 407 953 | 11/2003 |
| JP | 06-44339 | 2/1994 |

(Continued)

OTHER PUBLICATIONS

Jerry Joyce, Marianne Moon. "Microsoft® Office System Plain & Simple 2003 Edition". Published Sep. 10, 2003 by Microsoft Press. Pertinent Sections: 18☐☐.*

(Continued)

Primary Examiner — Rashawn Tillery
(74) Attorney, Agent, or Firm — Merchant & Gould

(57) ABSTRACT

A system combines 2D and 3D modeling in rendering shapes and includes: a 3D modeling factory to generate a 3D model of selected shape parameters or features; a front face factory to generate 2D text and text effects, and some 2D shape effects; a ground plane factory to generate effects that are rendered on a ground plane of a shape; and a rasterizer/compositing engine to combine 2D and 3D effects generated by the front face factory, ground plan factory, and the 3D modeling factory.

20 Claims, 5 Drawing Sheets

3D SHAPE WITH CONTOURS BASED ON 2D GEOMETRY

U.S. PATENT DOCUMENTS

| | | | |
|---|---|---|---|
| 6,697,489 B1 | 2/2004 | Candelore | |
| 6,847,361 B1 | 1/2005 | Kitsutaka | 345/426 |
| 6,879,327 B1 | 4/2005 | Mathur | |
| 7,009,611 B2* | 3/2006 | Di Lelle | 345/467 |
| 2002/0041286 A1 | 4/2002 | Kamen et al. | 345/582 |
| 2002/0094189 A1 | 7/2002 | Navab et al. | 348/207.99 |
| 2002/0154122 A1 | 10/2002 | Di Lelle | |
| 2004/0027398 A1 | 2/2004 | Jaeger | 345/863 |
| 2004/0184655 A1 | 9/2004 | Ziegler et al. | 382/154 |
| 2005/0081161 A1 | 4/2005 | MacInnes et al. | 715/765 |
| 2008/0143715 A1* | 6/2008 | Moden et al. | 345/422 |

FOREIGN PATENT DOCUMENTS

| | | |
|---|---|---|
| JP | 7-234949 | 5/1995 |
| JP | 07-152929 | 6/1995 |
| WO | WO 00/63848 | 10/2000 |

OTHER PUBLICATIONS

CustomGuide Inc. "PowerPoint 2003 Personal Trainer". Published Nov. 11, 2004 by O'Reilly. Pertinent Sections: 5.7-5.8.*

Mary Millhollon, Katherine Murray. "Microsoft® Office Word 2003 Inside Out". Published Nov. 5, 2003 by Microsoft Press. Pertinent Sections: Chapter 12. Enlivening Documents with Drawings and AutoShapes.*

Patrice-Anne Rutledge, Jim Grey, Tom Mucciolo. "Special Edition Using® Microsoft® Office PowerPoint® 2003". Published Sep. 13, 2003 by Que. Pertinent Sections: Chapter 14. Creating and Formatting Objects.*

"*Usar WordArt Para Producir*"; http://office.microsoft.com/es-es/powerpoint/HA011327513082.aspx; May 31, 2009; 1 pg.

Bendels, G.H., et al.; "*Mesh Forging: Editing of 3D-Meshes using implicitly Defined Occluders*"; Eurographics Symposium on Geometry Processing (2003); 12 pgs.; http://cg.cs.uni-bonn.de/docs/publications/2003/bendels-2003-mesh.pdf.

Foskey, et al.; "*ArtNova: Touch-Enabled 3D Model Design*"; University of North Carolin a Chapel Hill; (8 pgs); accessed Sep. 2005 at http://gamma.cs.unc.edu/ArtNova/artnova.pdf.

Jeng, E.K.Y, et al.; "*Moving cursor plane for interactive sculpting*"; ACM Transactions on Graphics; vol. 15, No. 3, pp. 211-222 (1996) 1 pg.; accessed Sep. 2005 at http://md1.csa.com/partners/viewrecord.php?requester=gs&collection=TRD&recid=02371 44CI &q=Skitters+and+Jacks%3A+Interactive+3D+Positioning &uid=1000214&setcookie=yes.

Li, et al.; "*Application of PowerPoint Professional Multimedia Example*"; China Youth Press, p. 31-47; May 2005.

Office Action dated Jun. 11, 2010, issued in EP Appl. No. 06803272.1.

Office Action dated Oct. 26, 2010, issued in AU Appl. No. 2006287351.

Office Action dated Sep. 9, 2010, issued in RU Appl. No. 2008108837, w/Translation.

Oh, Byong Mok, et al.; "*Image-Based Modeling and Photo Editing*"; ACM SIGGRAPH 2001, Aug. 12-17, 2004, Los Angeles, CA, USA; 10 pgs.; http://www.cs.fit.edu/~eribeiro/public/p433-oh.pdf.

Young, et al.; "Microsoft Office System Inside Out: 2003 Edition" Sep. 10, 2003.

Office Action dated Jun. 13, 2011, in JP Pat. Appl. No. 2008-530242, w/Translation.

Office Action dated Aug. 2, 2011, in CN Appl. No. 200680033182.6, w/translation.

Office Action dated Jun. 16, 2011, in MX Appl. No. MX/a/2008/003341, w/English summary-translation.

Bain, S.; Chapter 15 "*Mastering Object Outline Properties*" CorelDraw 12 The Official Guide; 2004; CorelPress; ISBN: 0-07-223191-2, pp. 301-315.

Bain, S.; Chapter 23 "*Creating Depth with Perspective Effects*" CorelDraw 12 The Official Guide; 2004; CorelPress; ISBN: 0-07-223191-2, pp. 483-492.

Bain, S.; Chapter 24 "*Extruding Vector Objects*" CorelDraw 12 The Official Guide; 2004; CorelPress; ISBN: 0-07-223191-2, pp. 493-517.

Office Action dated Aug. 30, 2011, in EP Appl. No. 06 803 272.1.

Office Action dated Sep. 15, 2011, in IL Appl. No. 189292, w/translation.

Kylander, K., et al.; "*GIMP: The Official Handbook—The Gimp user's manual version 1.0.1*"; Chapters 8, 11, 20, and 36; Nov. 3, 1999; The Coriolis Group, LLC; XP002571168.

European Search Report dated Mar. 31, 2010, in EP Appl. No. 06803272.1.

Glassner, A.; "Filler 'er up![Graphics filling algorithms]", IEEE Computer Graphics and Application, vol.21 Issue 1, Jan./Feb. 2001.

Office Action mailed Nov. 21, 2012, issued in Taiwan Pat. Appl. No. 095132738, with English Summary.

Search Report issued Nov. 15, 2012, in Taiwan Pat. Appl. No. 095132738.

Office Action dated Oct. 2, 2012, in MX/a/2008/003341, w/English Summary.

* cited by examiner

3D SHAPE

3D SHAPE WITH CONTOURS BASED ON 2D GEOMETRY

2D EDITING METAPHOR FOR 3D GRAPHICS

BACKGROUND

There are a number of tools in existence today that let users create professional business graphics such as a presentation. An approach for adding polish to shapes and images is to apply 3D techniques. This is usually done in two ways: one is the use of simulated 3D effects on 2D bitmaps, which results in 3D looking shapes or images, without a real 3D model. The resulting simulated 3D graphics may not appear to be sufficiently 3D for some uses. The other approach is to use a full 3D model. Here the users build 3D models of the items to be displayed. This approach typically requires that the users be skilled in 3D modeling and in using the 3D modeling tool. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, a system that combines 2D and 3D modeling in rendering shapes. In one aspect, the system includes: a 3D modeling factory to generate a 3D model of selected shape parameters or features; a front face factory to generate 2D text and text effects, and some 2D shape effects (e.g., fill effects); a ground plane factory to generate effects that are rendered on a ground plane of a shape; and a rasterizer/compositing engine to combine 2D and 3D effects generated by the front face factory, ground plan factory, and the 3D modeling factory.

The front face factory renders any 2D text effects (e.g. shadow, glow, reflection); any 2D shape effects; any 2D surface effects (e.g., fill, gradient fill, image, etc.) and the 2D geometry of the shape; and creates a texture map using the rendered 2D text effects and 2D surface effects for the front surface of the shape. These 2D effects are some of the 2D metaphors that will be preserved when applied to the 3D shapes. The ground plane factory generates a ground plane for the 2D shape effects (if any). In addition, if the text has 3D effects applied, the ground plane factory generates a ground plane for the 2D text effects. The 3D modeling factory generates a 3D model from the 2D shape geometry by defining extrusion and beveling properties of the shape. The 3D modeling factory then generates coordinates for mapping the texture onto the front face of the 3D model. The rasterizer/compositing engine then combines the resulting shape from the 3D modeling factory (i.e., with 3D geometry and 2D texture map) with the ground plane(s) from the ground plane factory. The rasterizer/compositing engine uses the texture coordinates to map the texture onto the 3D model.

In another aspect, the color(s) of the shape as selected by the user are maintained independent of lighting and/or orientation of the shape.

In still another aspect, shapes may be grouped to control perspective in 3D scenes. For example, ungrouped 3D shapes can be rendered so that they each appear to have a separate vanishing point. In contrast, grouped 3D shapes can be rendered so that they appear to have the same vanishing point. Accordingly, a user can use the familiar 2-D editing concept of a group, and apply the knowledge from editing 2D graphics to the 3D world. Grouping will intuitively do the right thing, and thus make it easy for users to adapt to the new world where 3D editing is possible.

In yet another aspect, the system allows a user to control the ordering of shapes being rendered. In one implementation, the system uses the 2D metaphor of "send to front", "send to back", etc. used in some 2D tools to allow a user to control how shapes will appear to be ordered in 3D space. For example, the user can specify that in a particular perspective a shape A will be "in front" of a shape B but "behind" a shape C. Again, the familiar concept of Bordering 2D shapes for ordering shapes in front of or behind other shapes can be applied to ordering 3D shapes in a 3 dimensional space.

In another aspect, the system provides a user interface that routes and reuses 2D commands such that they are applicable in a 3D context.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Exemplary 2D/3D Combined Rendering System

A problem with the aforementioned simulated 3D and the 3D modeling approaches is that they are incomplete with regard to typical business uses. For example, users may have shapes with a 2D effect (e.g., a gradient) that they want to put into 3D perspective for effect, or a complex 3D model for which they want to use a picture texture map, a gradient effect, or a simple shadow. The simulated 3D approach and the 3D modeling approach separately only provide a portion of a solution for the above example scenario.

Embodiments presented below allow the use of both 3D and 2D effects combined into one pipeline, which generates professional looking business graphics. The user need not have a detailed understanding of 3D modeling (which is likely among typical business users) in order to use embodiments of the system.

Figure 1:
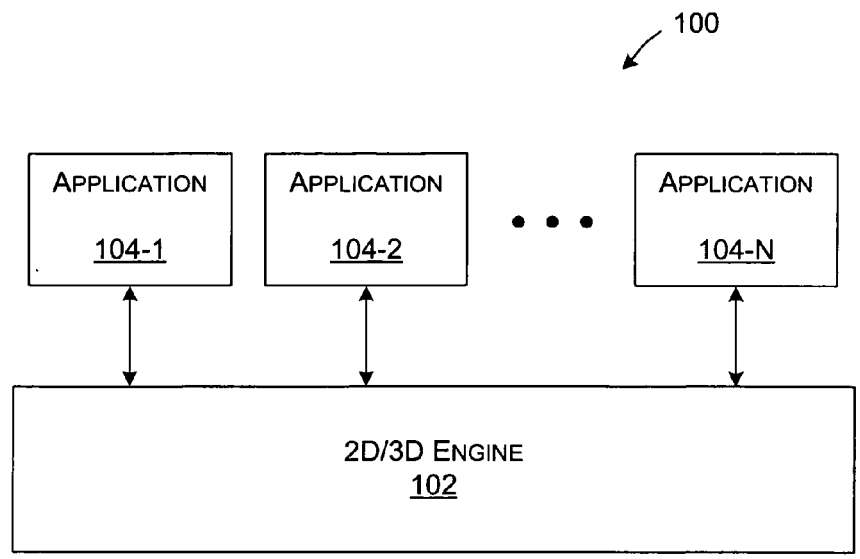
FIG. 1 is a block diagram representing an exemplary system with multiple applications and a 2D/3D engine, according to an embodiment.

FIG. 1 illustrates an exemplary system 100 that that combines 2D and 3D modeling in rendering shapes. In this embodiment, system 100 includes a 2D/3D engine 102, and one or more application programs indicated as applications 104-1 through 104-N in FIG. 1. Applications 104-1 through 104-N use 2D/3D engine to provide 3D effects to 2D shapes and shape effects inputted by users of applications 104-1 through 104-N. In addition, 2D/3D engine 102 can also provide 3D effects to text associated with the shapes. In accordance with one embodiment, 2D/3D engine 102 receives 2D shape input and generates a 3D model of some portions of the 2D shape so that the rendering output contains portions that are generated from 2D shapes and effects (and 2D text and effects, if any) and portions that are generated from the 3D model. This combined approach is unlike the aforementioned simulated 3D approach (which does not include a 3D model) and the purely 3D modeling approach. An example implementation of 2D/3D engine 102 is described below in conjunction with FIG. 2.

Although a "shared" 2D/3D engine embodiment is described above, in alternative embodiments, each application that can generate 3D shapes may have an embedded 2D/3D engine as opposed to separate 2D/3D engine 102:

Exemplary Components of a 2D/3D Engine

Figure 2:
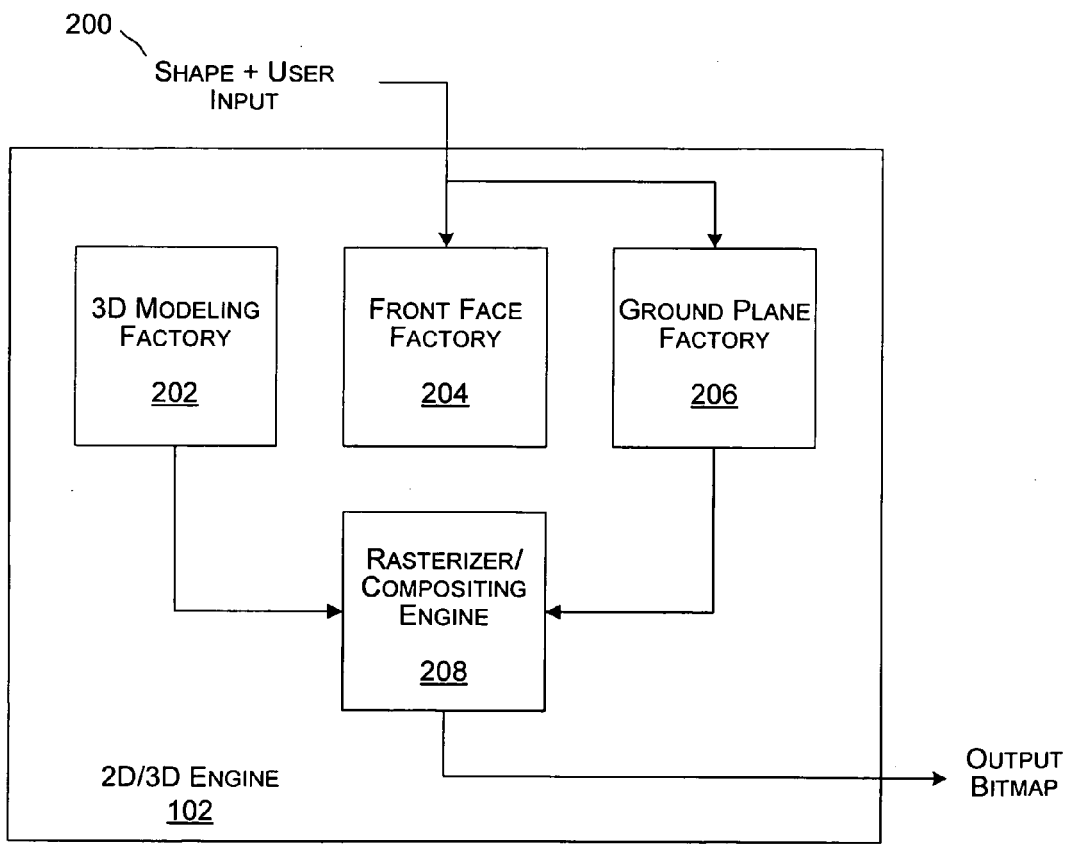
FIG. 2 is a block diagram representing exemplary components of the 2D/3D engine of FIG. 1, according to an embodiment.

FIG. 2 illustrates exemplary components of 2D/3D engine 102 (FIG. 1) according to one embodiment. In this embodiment, 2D/3D engine 102 includes a 3D modeling factory 202, a front face factory 204, a ground plane factory 206 and a rasterizer/compositing engine 208. 3D modeling factory generates a 3D model of selected shape parameters or features. Front face factory 204 generates 2D text and text effects, and some 2D shape effects (e.g., fill effects). Ground plane factory 206 generates effects that are rendered on a ground plane of a shape. Rasterizer/compositing engine 208 combines 2D and 3D effects generated by front face factory 204, ground plan factory 206, and 3D modeling factory 202.

In operations, when 2D/3D engine 102 receives a shape with 2D effects as indicated by an arrow 200 (e.g., as selected by a user using a user interface provided by an application such as application 104-1 of FIG. 1), front face factory 204 disassembles the shape into the following parts: text included in the shape (if any); the 2D surface of the front face (i.e., the surface effects of the front face of the shape); the 3D effects (if any) applied to the text; any ground plane effects (e.g., shadow, glow, reflection effects that are rendered into a ground plane of the shape); and the geometry of the shape (e.g., circle, rectangle, arrow, etc.).

In this embodiment, front face factory 204 renders: any 2D text effects (e.g. shadow, glow, reflection); any 2D shape effects; any 2D surface effects (e.g., fill, gradient fill, image, etc.) and the 2D geometry of the shape; and creates a texture map using the rendered 2D text effects and 2D surface effects for the front surface of the shape. In accordance with this embodiment, front face factory 204 generates the texture map so that the front surface of the shape retains its 2D surface effects (e.g., fill color) for all orientations of the shape under any simulated lighting conditions. For typical business users, this 2D surface effect preservation feature is desirable (even though it may appear less realistic) because the inputted 2D surface effect (e.g., fill color) is the effect that the users actually want as a result (as opposed to how the surface effect might appear when the shape with this surface effect is re-oriented).

Further, in one embodiment, front face factory 204 dilates textures (e.g., containing the fill effect or image) by one pixel to make sure all parts of the front face of the 3D model are covered by the image fill.

In this embodiment, ground plane factory 206 generates a ground plane for the 2D shape effects (if any). In addition, if the text has 3D effects applied, ground plane factory 206 generates a ground plane for the 2D text effects. Ground plane generator 206 takes 2D effects such as shadow, blur, and reflection and draws them into a background plane. When a 3D effect is added to the shape by 3D modeling factory (e.g., as described below), a ground plane is created and the 2D shape effects such as shadow, blur, and reflection are rendered on the ground plane. The ground plane would be rendered behind the shape. The ground plane for the 3D text and its effects is rendered in front of the shape. This feature allows the use of mostly 2D operations in a 3D scene with the effective result being a realistic looking 3D scene.

In this embodiment, 3D modeling factory 202 generates a 3D model from the 2D shape geometry by defining extrusion and beveling properties of the shape. The 3D modeling factory then generates coordinates for mapping the texture onto the front face of the 3D model. For example, the 3D modeling factory will "wrap" the 2D surface effects (e.g., a picture or color) around the bevel.

Figure 3:
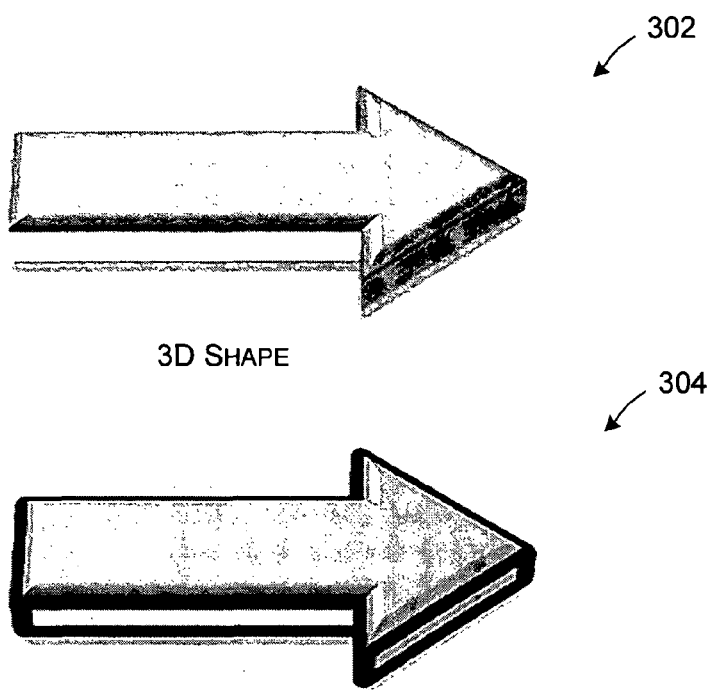
FIG. 3 is a diagram representing a 3D shape with contours based on the shape's 2D geometry, according to an embodiment.

Further, in one embodiment, 3D modeling factory 202 generates contours of 3D shapes based on their underlying 2D geometry. An example of contours is illustrated in FIG. 3. In this example, when a user enables the contours feature for a shape, the "outline" of the shape is made thicker. The color of the contour is user definable. For example, white contours can be used to set off dark shapes over a dark background. Rather than generate the contours during the 3D modeling, the contours are generated from the underlying 2D shape as well as parts of the 3D model generated from the 2D shape (shown as shape 302) and applied to the extrusion and beveling. The result is illustrated as shape 304.

In this embodiment, rasterizer/compositing engine 208 then combines the resulting shape from 3D modeling factory 202 (i.e., with 3D geometry and 2D texture map) with the ground plane(s) from ground plane factory 206. The rasterizer/compositing engine 208 uses the texture coordinates to map the texture onto the 3D model.

Exemplary Components for Rendering 3D Text

Figure 4:
FIG. 4 is a diagram representing 3D text and text effects applied to a shape's text, according to an embodiment.

In one embodiment (not shown), there is a separate front face factory, a ground plane factory and a 3D modeling factory for 3D text. The front face factory renders the 2D effects of the text. The 3D modeling factory generates a 3D model of the text by defining extrusion and beveling properties of the text and mapping the 2D text effects on the 3D model of the text. The ground plane factory creates a separate ground plane for the 3D text, and then 2D effects such as shadow, blur and reflection are rendered on this ground plane. This ground plane would sit on top of the shape so that the text effects will be viewable. An example of 3D text is illustrated in FIG. 4.

Exemplary Operational Flow for Generating a 3D Graphic from a 2D Input Shape

Figure 5:
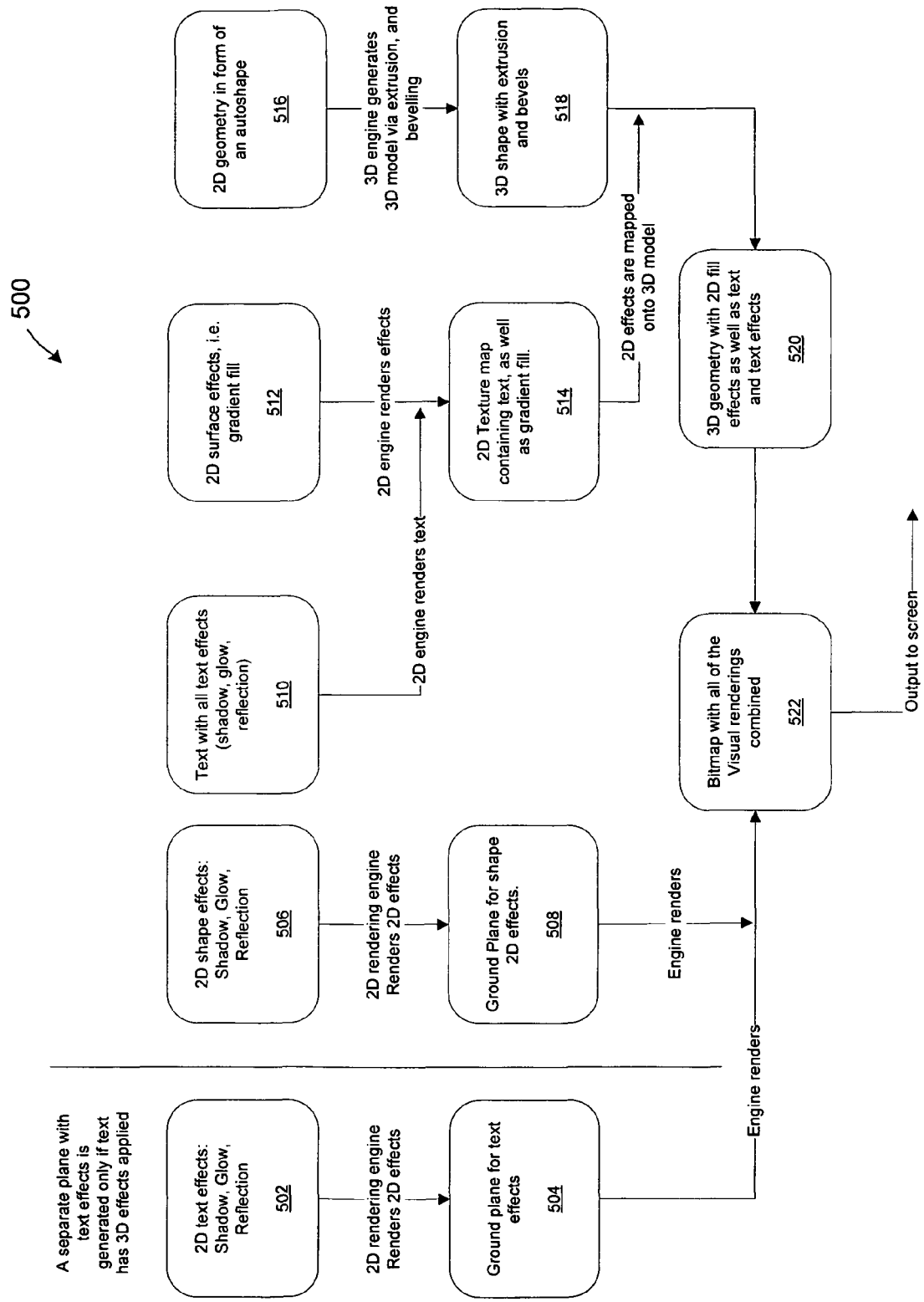
FIG. 5 is a flow diagram representing operational flow in generating a 3D graphic from a 2D shape input, according to an embodiment.

FIG. 5 is a flow diagram representing an operational flow 500 in generating a 3D graphic from a 2D shape input, according to an embodiment. Operational flow 500 may be performed in any suitable computing environment. For example, operational flow 400 may be executed by a system such as 2D/3D engine 102 (FIG. 2). Therefore, the description of operational flow 500 may refer to at least one of the components of FIG. 2. However, any such reference to components of FIG. 2 is for descriptive purposes only, and it is to be understood that the implementations of FIG. 2 are a non-limiting environment for operational flow 500. In this example operational flow, a user using an application such as application 104-1 (FIG. 1) has created a shape that is to be rendered.

At a block 502, if the shape has text, a 2D rendering engine renders any 2D text effects that are to be applied to the text (e.g., as enabled by a user via the application). In one embodiment, the 2D rendering engine is a standard 2D rendering engine and is part of a front face factory such as front face factory 204 (FIG. 2).

At a block 504, if 3D text effects are applied (e.g., as enabled by a user), a ground plane factory (e.g., similar to ground plane factory 206 but directed to text instead of shapes) creates a 3D ground plane for the text. This ground plane is separate from the ground plane of the shape.

Blocks 502 and 504, in this example, are performed only if 3D effects are to be applied to the shape's text.

At a block 506, 2D shape effects are applied to the shape. In one embodiment, the aforementioned 2D rendering engine applies the 2D shape effects (e.g., shadow effect, glow effect, reflection effect) to the shape.

At a block 508, a shape ground plane is created and the 2D shape effects are associated with the shape ground plane. In one embodiment, a ground plane factory such as ground plane factory 206 creates the ground plane and associates the 2D shape effects (e.g., shadow effect, glow effect, reflection effect) to the shape ground plane.

At a block 510, is the same as block 502, but is performed in scenarios in which there are no 3D effects being applied to the shape's text.

At a block 512, 2D surface effects are applied to the shape. In one embodiment, the 2D rendering engine of the front face factory applies the surface effects (e.g., fill, gradient fill, image, etc.) to the shape.

At a block 514, a texture map is created using the 2D text effects and 2D surface effects from blocks 510 and 512. In one embodiment, the front face factory creates the texture map.

At a block 516, a 2D geometry is obtained from the shape. In one embodiment, a 3D modeling factory such as 3D modeling factory 202 (FIG. 2) obtains the 2D geometry from the shape.

At a block 518, a 3D model is generated from the 2D geometry obtained at block 516. In one embodiment, the aforementioned 3D modeling factory generates the 3D model by defining extrusion and bevel parameters for the shape.

At a block 520, the texture map from block 514 is mapped onto the 3D model from block 518. In one embodiment, the 3D modeling factory maps the texture map onto the 3D model so that the front face of the shape has the 2D text, text effects, and surface effects from blocks 510 and 512. In addition, the 3D modeling factory can also apply the texture map to 3D features such as the extrusion and bevel (e.g., "wrap" the fill around the bevels and extrusions).

At a block 522, a bitmap is created from the 3D shape from block 520 combined with the ground plane from block 508. In one embodiment, a rasterizer/compositing engine such as rasterizer/compositing engine 208 (FIG. 2) creates the bitmap. In addition, in scenarios in which 3D effects are applied to the shape's text, the rasterizer/compositing engine also uses the ground plane from block 504 to create the bitmap.

Although operational flow 500 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Figure 6:
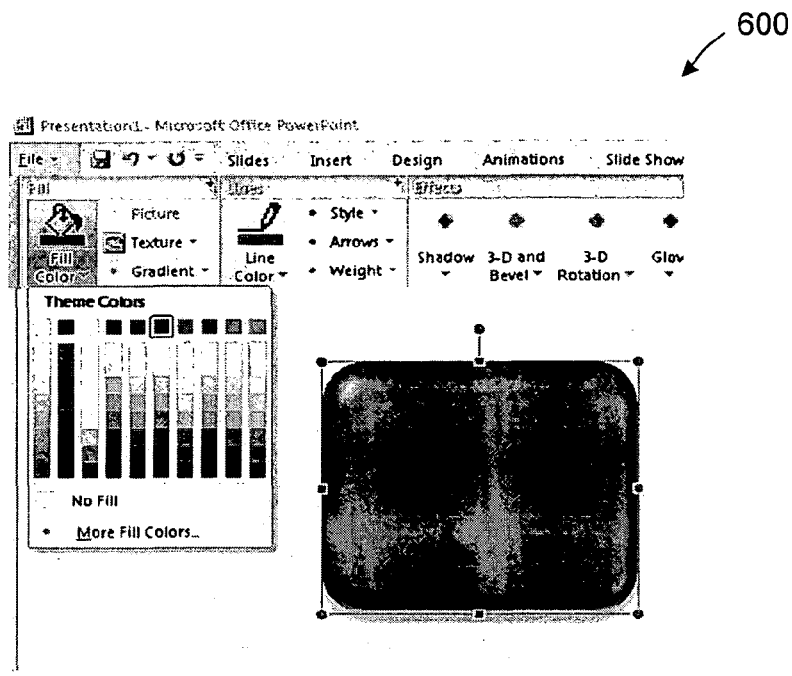
FIG. 6 is a diagram representing an example screenshot from a user interface (UI) using a 2D metaphor for fill, according to an embodiment.

FIG. 6 illustrates an example screenshot 600 from a user interface (UI) using a 2D metaphor for fill, according to an embodiment. In this example, a user can select a color for the surface of the shape (i.e., a 3D rectangle with rounded corners and rounded bevel. This UI feature is similar to one for selecting color fill for a 2D tool, which advantageously allows a user who is experienced with a 2D tool to relatively easily adapt to a 3D tool with a 2D/3D engine such as that illustrated in FIG. 2.

Further, front face factory 204 (FIG. 2) allows a 3D object's front face color to be adjusted without being affected by lighting. This is accomplished in one embodiment by providing the user with pre-set lighting figurations that satisfy the following constraints:

$$\text{sum}[L_d*(N \cdot L_{dir})] = 1 - \text{Ambient Light} \quad (1)$$

$$\text{Min}[V_s*\text{sum}[L_s*(N \cdot H)P]] \quad (2)$$

In equation (1), $L_d$ is a directional light color, $L_{dir}$ the directional vector of the light, and N the surface normal of the front face (which is almost always (0, 0, −1) in the 2D contexts). Ambient Light is the color and intensity of the ambient contribution.

For equation (2), $V_s$ is the shape's specular color, $L_s$ the light's specular strength, N the surface normal (which again will almost always be (0, 0, −1)), H the halfway vector and P the glossiness of the surface. Equation (2) is minimized, and ideally should be zero. This can be accomplished in a variety of ways, such as setting $V_s$ to zero, reducing the specular strength or making P very large.

By designing light combinations that satisfy equation (1) and minimize equation (2), a 3D shape's front face will maintain its color for whatever lighting is used and whatever orientation the 3D shape has. This optimization is possible because we can make the assumption that a 3D shape's front face normal will most often point in the direction (0, 0, −1).

Figure 7:
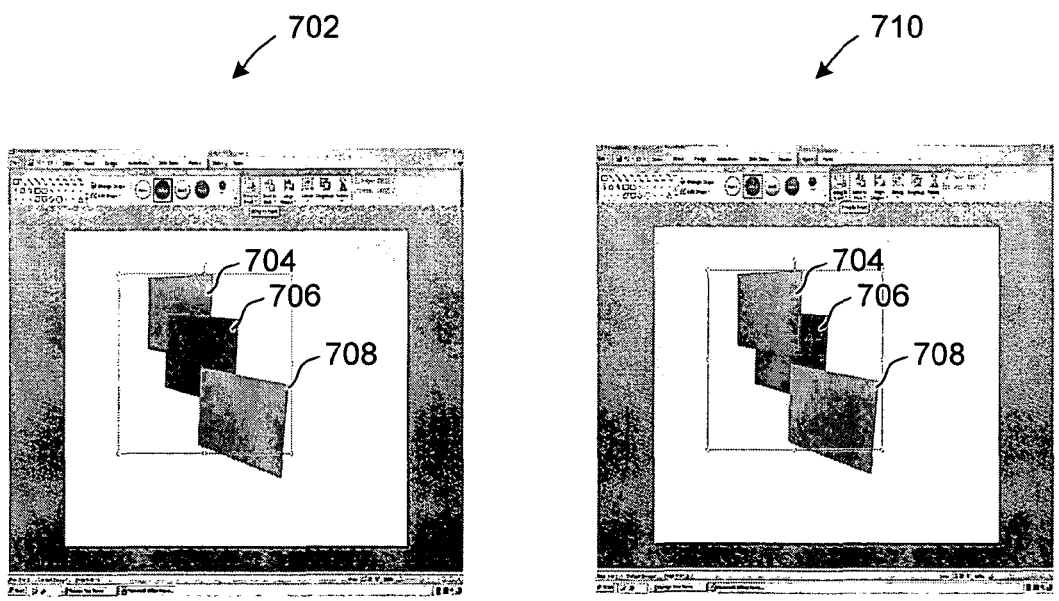
FIG. 7 is a diagram representing an example of different ordering of shapes in a 3D space, according to one embodiment.

FIG. 7 illustrates an example of different ordering of shapes in a 3D space, according to one embodiment. In this example, the UI shown in FIG. 7 allows a user to control the ordering of shapes being rendered. In one embodiment, the system uses the 2D metaphor of "send to front", "send to back", etc. as used in some 2D tools to allow a user to control how shapes will appear to be ordered in 3D space. For example, in screenshot 702, the order of the shapes is: shape 704 is behind a shape 706, which in turn is behind a shape 708. The user can use the UI to change the order of shapes 704, 706 and 708. For example, in screenshot 710, the user has changed the order by using a "send to back" command on shape 706. In an alternative embodiment, "send to front" and "send to back" commands are implemented to stack shapes like wooden blocks in 3D space. This embodiment is not illustrated. In yet other embodiments, this "stacking send to front" and "stacking send to back" commands can be used in addition to the aforementioned "send to front" and "send to back" commands.

Figure 8:
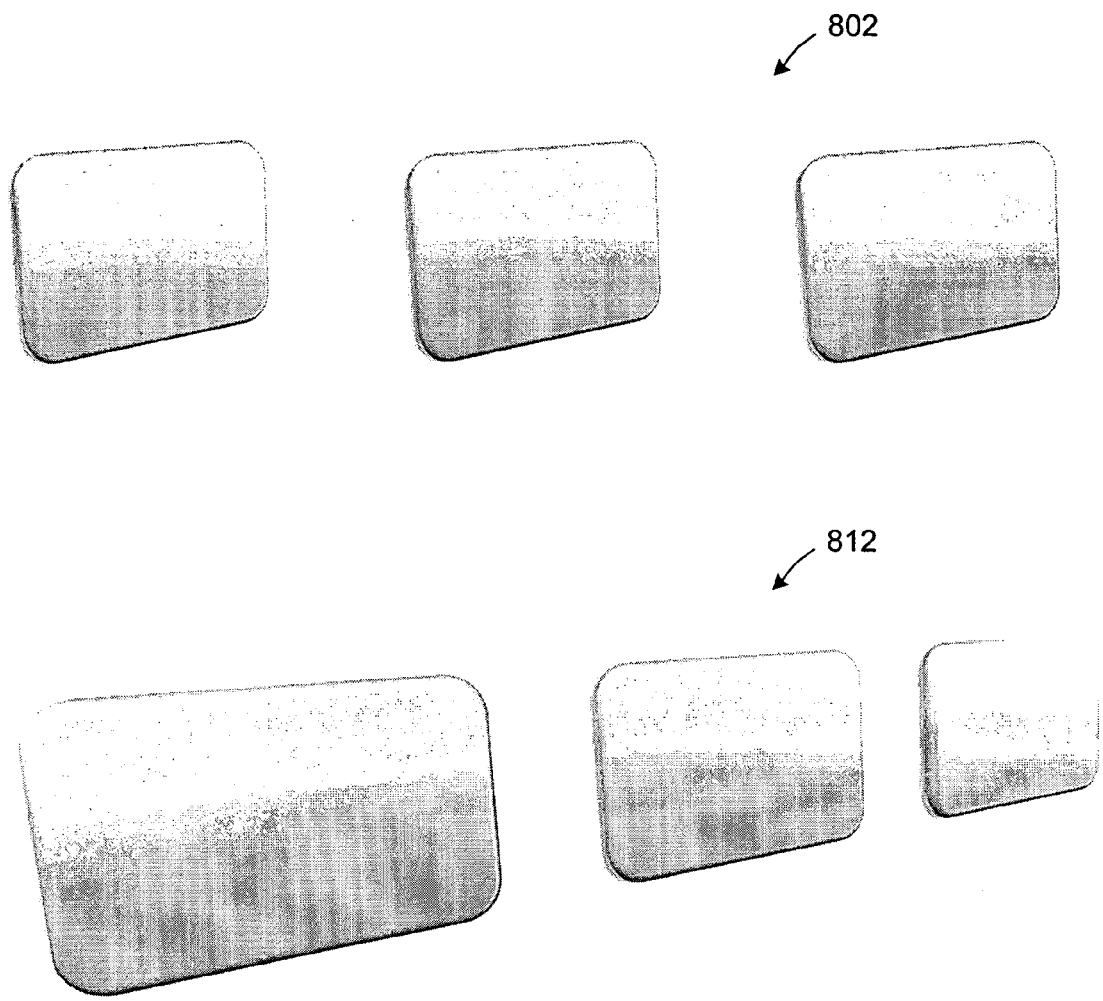
FIG. 8 is a diagram representing an example of ungrouped objects in a 3D perspective and an example of grouped objects in a 3D perspective, according to an embodiment.

FIG. 8 is a diagram representing an example of ungrouped shapes 802 in a 3D perspective and an example of grouped shapes 812 in a 3D perspective, according to an embodiment. As can be seen in FIG. 8, each shape of ungrouped shapes 802 appears to have a separate vanishing point, thereby providing a less realistic 3D perspective of the shapes. In contrast, grouped shapes 812 (which are grouped using a "group" command similar to group commands available in some 2D tools) appear to have a common vanishing point. This common vanishing point provides a more realistic 3D perspective of the shapes.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A method that combines 2D and 3D modeling for rendering shapes, the method comprising:
    providing a user interface for selecting parameters of a shape, wherein the user interface provides: one or more controls to select one or more corresponding 2D parameters for the shape; wherein the user interface comprises an ordering user-selectable control to control the ordering of shapes being rendered in a 3D space, wherein the ordering user-selectable control causes an ordering of a selected 3D shape to change a relative position ordering 3D shapes such that a selected 3D shape appears to be in front of at least one other 3D shape when the selected 3D shape is positioned in front of the at least one other 3D shape using the ordering user-selectable control and wherein the selected 3D shape appears to be in back of the at least one other 3D shape when the selected 3D shape is positioned in back of the at least one other 3D shape using the ordering user-selectable control; wherein the user interface comprises a grouping control for grouping 3D shapes and when grouped the 3D shapes appear to have a common vanishing point and when ungrouped the 3D shapes appear to have a separate vanishing point;
    applying 2D shape effects using a 2D rendering engine to the shape;
    applying 2D surface effects using the 2D rendering engine to the shape;
    creating a texture map from 2D text that includes applied 2D text effects and 2D surface effects; wherein the 2D text effects comprise at least one of: shadow, glow, and reflection; and wherein the 2D surface effects comprise at least one of fill, gradient fill, and image;
    obtaining a 2D geometry from the shape;
    generating a first ground plane for the 2D shape effects;
    generating and rendering the 2D text effects on a second ground plane when 3D effects are applied to the 2D text;
    generating a 3D model using the obtained 2D geometry;
    mapping the texture map onto the 3D model; and
    rendering the 3D model.

2. The method of claim 1 wherein the 2D parameters include a fill color for the shape.

3. The method of claim 2 wherein the fill color's appearance remains substantially constant in response to a change in orientation of the 3D model.

4. The method of claim 2 wherein the fill color's appearance remains substantially constant in response to a change in lighting of the 3D model.

5. The method of claim 2 wherein the 2D parameters include a gradient in the fill color for the shape.

6. The method of claim 1 wherein the 2D parameters include a line color for the shape.

7. The method of claim 1 wherein the 2D parameters include a line weight for the shape.

8. The method of claim 1 wherein the 2D parameters include an ordering of two or more shapes being rendered on a display.

9. The method of claim 8 wherein the user interface includes a user-selectable control to cause a selected 3D shape to appear to stack onto at least one other 3D shape.

10. The method of claim 8 wherein the user interface includes a user-selectable control to cause a selected 3D shape to appear stacked in back of at least one other 3D shape.

11. The method of claim 1 wherein the user interface includes a user-selectable control to group two or more 3D shapes being rendered on a display.

12. The method of claim 11 further comprising a user-selectable control to ungroup two or more grouped 3D shapes.

13. A system for rendering shapes, the system comprising:
    a 2D/3D rendering engine operating on a processor in a computing system including that is arranged to render shapes created using both 2D modeling and 3D modeling;
    an application that is configured to provide a user interface for selecting parameters of a shape, wherein the user interface provides: means for selecting one or more corresponding 2D parameters for the shape comprising an ordering user-selectable control to control the ordering of shapes being rendered in a 3D space such that using the control moves a 3D shape to appear in front of at least one other 3D shape using the ordering user-selectable control and wherein the selected 3D shape appears to be in back of the at least one other 3D shape when the selected 3D shape is positioned in back of the at least one other 3D shape using the ordering user-selectable control and a grouping control for grouping 3D shapes and when grouped the 3D shapes appear to have a common vanishing point and when ungrouped the 3D shapes appear to have a separate vanishing point;
- a 2D rendering engine comprising means for applying 2D shape effects and 2D surface effects to the shape;
- means for creating a texture map from 2D text that includes applied 2D text effects and 2D surface effects;
- means for generating a first ground plane for the 2D shape effects;
- means for generating and rendering the 2D text effects on a second ground plane when 3D effects are applied to the 2D text;
- a 3D modeling factory comprising means for obtaining a 2D geometry from the shape; and means for generating a 3D model using the obtained 2D geometry;
- means for mapping the texture map onto the 3D model; and means for rendering the 3D model.

14. The system of claim 13 wherein the 2D parameters include a fill color for the 3D shape.

15. The system of claim 14 wherein the fill color's appearance remains substantially constant in response to a change in orientation of the 3D model or a change lighting of the 3D model, or both.

16. The system of claim 13 wherein the 2D parameters include one or more parameters selected from a group comprising: a gradient in a fill color for the shape; a line color for the shape; a line weight for the shape; an ordering of two or more shapes being rendered on a display.

17. The system of claim 13 wherein the user interface includes a means for causing a selected 3D shape to appear to be in front of at least one other shape.

18. The system of claim 13 wherein the user interface includes a means for causing a selected 3D shape to appear to be in back of at least one other shape.

19. The system of claim 13 wherein the user interface includes a user-selectable means for grouping two or more 3D shapes being rendered on a display.

20. The system of claim 19 further comprising a user-selectable means for ungrouping two or more grouped 3D shapes.

* * * * *